Patented Nov. 10, 1942

2,301,488

UNITED STATES PATENT OFFICE 2,301,488

METHOD OF REMOVING OPAQUE FROM PHOTOGRAPHIC NEGATIVES

Leslie E. Whittenberg, Rochester, N. Y., assignor to Eastman Kodak Company, Rochester, N. Y., a corporation of New Jersey No Drawing. Application October 7, 1941, Serial No. 414,038

4 Claims. (Cl. 95—5)

This invention relates to removing opaquing materials from photographic negatives and more particularly to a method of removing the opaque materials without disturbing the image on the negative or causing the photographic emulsion of the negative to swell.

One of the newest industrial applications of photography and probably the most important contribution of photography to defense industry is its adaptation to line copying and to template or pattern making. In the airplane industry alone the great increase of orders placed a gigantic burden upon engineering departments to furnish patterns from original drawings and to reproduce line copy from one material to another. In the main, all this work was done by hand and this was not only time consuming but also often resulted in errors and required constant checking against the original specifications.

The lofting methods employed required first laying out a full scale general drawing of the entire part onto plywood in pencil. The pencil lines were then scribed to make them permanent. A sheet of vellum paper was then placed over the scribed drawing and a pencil tracing was made. This tracing is for subsequent blue print making of individual areas of the general drawing. After completing the general drawing, individual patterns were hand drawn onto template materials such as steel, plywood, etc. again using the information from the original engineering blue print or from the general drawing. These template drawings are also scribed to assure line retention and the finished patterns are cut out.

Various photographic methods have been devised to eliminate this laborious scribing and copying required by the above described lofting methods.

The following method, however, is in particular improved by my invention and is, therefore, described so that my invention may be better understood.

An original engineering drawing is made by penciling or inking onto a metal sheet such as aluminum or steel sheets. The drawing, on this sheet is photographed to produce a negative image on sensitized plate glass. The glass plate negative is then placed in the camera and occupies the identical position it had during its exposure to the image of the drawing. A piece of template steel coated with a light sensitive film is then placed in the identical position previously occupied by the drawing. A lamphouse placed behind the negative then projects an image of the drawing onto the sensitized steel. After exposure to the projected light the sensitized steel is processed photographically. It then represents a finished reproduction of the drawing, has a clear permanent image, and the lines can be followed to cut out a final template.

However, if the original drawing is large or has details not required for all purposes it may be desired to eliminate certain lines before making the template or other reproduction. This may be done by making the undesired lines on the master negative opaque by applying a water soluble opaquing material such as that sold on the market as "Eastman opaque," a product of the Eastman Kodak Company. This opaque is, substantially insoluble in alcohol. The desired reproduction is then made using the cameras as above indicated. If other portions of the drawing are desired for reproduction the opaque may be removed from the negative at those portions and opaque applied to other portions not desired. Thus successive reproduction of detail portions from a master negative may be obtained by successive application and removal of opaque.

To apply the oqaque it is dissolved in water and applied to the negative with a brush or other suitable applicator. However, when repeatedly removing the opaque from the photographic emulsion on the negative it was found that the additional water required to soften the opaque caused swelling of the gelatin of the emulsion and destroyed the exactness of the drawings. Smearing of the lines on the negative also occurred.

An object of the invention, therefore, is a method of removing opaque from photographic emulsion coatings without causing swelling of the gelatin in the emulsion or smearing of the drawing. Other objects will appear hereinafter.

In accordance with the invention, the objects of the invention are attained by applying the opaque from a water solution by a brush or other applicator to the part of the photographic negative which it is desired to eliminate from the image of the master drawing. The negative is then employed as above described, or by other methods, to form a positive image on a template or other surface. To remove the opaque I employ a solution of water and alcohol. The alcohol may be methyl or ethyl alcohol. I have found that a solution of 40 to 70% alcohol works well and will remove opaque from the negatives readily without smearing and has no swelling or detrimental effect on the gelatine of the photographic emulsion of the negative. In addition the solution dries rapidly and the negative is soon ready for another coating of opaque, if such is desired.

The following are examples of how my invention is employed in making different positive images from a master negative photographic glass plate or the like.

Example 1

A master negative plate having an image of an engineering drawing thereon is first coated with a water soluble opaque material to opaque out certain lines not at present desired on the positive image about to be made. The negative is then placed in a camera and a light is passed through it and caused to impinge on a sensitized metal sheet held adjacent thereto. The resulting image on the metal sheet is then employed to guide a mechanic in cutting out the desired template.

If another shaped template is required I may remove the opaque with a solution of 50% ethyl alcohol in water by applying the solution with a brush or soft cloth and gently rubbing it off. The solution can be permitted to dry or can be subjected to delicate drying methods. In a few minutes a new coating of opaque may be applied and the photographic reproduction process repeated.

Example 2

In place of the solution employed in Example 1, I have found the opaque may be removed with a solution of 67% methyl alcohol in water.

While I preferably use the above identified opaquing material, my invention is in general applicable for use with any opaque containing a pigmenting or coloring material and a water soluble gum.

I claim,

1. A method of forming a plurality of images from a master negative photographic plate having a gelatine emulsion coating thereon which comprises applying a water soluble opaquing material over a portion of the negative, forming a positive image by exposing a sensitized film to light passing through the negative, removing the opaque from the negative without detrimentally affecting the photographic emulsion with an alcohol-water solution containing from 40 to 70% of an alcohol having the formula $C_nH_{2n+1}OH$ wherein $n$ stands for a small whole positive number, drying the negative and applying opaque to another portion of the negative and again forming an image on a sensitized film.

2. A method of removing water soluble opaque from a gelatine emulsion coated negative plate without causing swelling of the gelatine and distortion of the image on the negative which comprises softening the opaque with a 50% solution of an alcohol having the formula $C_nH_{2n+1}OH$ wherein $n$ stands for a whole positive number less than 3 and wiping it from the negative.

3. A method of removing water soluble opaque from a gelatine emulsion coated negative plate without causing swelling of the gelatine and distortion of the image on the negative which comprises softening the opaque with a 50% ethyl alcohol solution and wiping it from the negative.

4. A method of removing water soluble opaque from a gelatine emulsion coated negative plate without causing swelling of the gelatine and distortion of the image on the negative which comprises softening the opaque with a 60% methyl alcohol solution and wiping it from the negative.

LESLIE E. WHITTENBERG.